(12) United States Patent
Hauschild et al.

(10) Patent No.: US 7,974,763 B2
(45) Date of Patent: Jul. 5, 2011

(54) PROCESS AND ONBOARD POWER SUPPLY OF A MOTOR VEHICLE WITH AN ANTICIPATING TEMPORARY TORQUE DERIVATION OF THE INTERNAL-COMBUSTION ENGINE

(75) Inventors: Martin Hauschild, Munich (DE); Olaf Lemke, Munich (DE); Torsten Herzog, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/713,656

(22) Filed: Feb. 26, 2010

(65) Prior Publication Data
US 2010/0222984 A1    Sep. 2, 2010

Related U.S. Application Data

(63) Continuation of application No. PCT/EP2008/006681, filed on Aug. 14, 2008.

(30) Foreign Application Priority Data

Aug. 30, 2007 (DE) .......................... 10 2007 040 905

(51) Int. Cl.
F02D 43/00 (2006.01)
(52) U.S. Cl. ..................................................... 701/102
(58) Field of Classification Search .................. 701/101, 701/102; 180/6.28
See application file for complete search history.

(56) References Cited

U.S. PATENT DOCUMENTS

| | | | | |
|---|---|---|---|---|
| 4,582,032 A | * | 4/1986 | Hara et al. | 123/339.11 |
| 4,660,671 A | * | 4/1987 | Behr et al. | 180/446 |
| 4,883,034 A | * | 11/1989 | Yashiki et al. | 123/339.17 |
| 5,000,278 A | * | 3/1991 | Morishita | 180/446 |
| 5,253,623 A | * | 10/1993 | Melnyk et al. | 123/339.11 |
| 5,666,917 A | * | 9/1997 | Fraser et al. | 123/339.11 |
| 5,718,200 A | * | 2/1998 | Chujo et al. | 123/339.16 |
| 5,765,527 A | * | 6/1998 | Lehner et al. | 123/339.1 |

(Continued)

FOREIGN PATENT DOCUMENTS

DE           43 05 573 A1     8/1994

(Continued)

OTHER PUBLICATIONS

International Search Report dated Dec. 29, 2008 with English translation (six (6) pages).

(Continued)

*Primary Examiner* — Stephen K Cronin
*Assistant Examiner* — Arnold Castro
(74) *Attorney, Agent, or Firm* — Crowell & Moring LLP

(57) ABSTRACT

The invention relates to a method for reducing the energy consumption of a motor vehicle having an internal-combustion engine and having at least one electric onboard power supply to which at least a first electric consuming device is connected. In a first operating condition, the internal-combustion engine is operated with a first injection quantity and a first ignition point. In a second operating condition, the internal-combustion engine is operated with a second injection quantity higher than the first injection quantity and a second ignition point. The second ignition point in time is less favorable than the first ignition point in the case of the second injection quantity with respect to the capacity of the internal-combustion engine. Upon detecting a substantially imminent special driving situation, a driving situation detection device causes the internal-combustion engine to change from the first operating condition into the second operating condition.

19 Claims, 4 Drawing Sheets

U.S. PATENT DOCUMENTS

| | | | | |
|---|---|---|---|---|
| 5,947,084 A | * | 9/1999 | Russell et al. | 123/339.16 |
| 6,109,236 A | * | 8/2000 | Takahashi et al. | 123/339.19 |
| 6,466,848 B2 | * | 10/2002 | Ozaki | 701/41 |
| 7,201,123 B2 | | 4/2007 | Mayer | |
| 2004/0251060 A1 | * | 12/2004 | Mayer | 180/6.2 |
| 2005/0051125 A1 | | 3/2005 | Braun et al. | |
| 2007/0272187 A1 | * | 11/2007 | Celisse et al. | 123/179.4 |

FOREIGN PATENT DOCUMENTS

| | | |
|---|---|---|
| DE | 199 31 144 A1 | 7/2000 |
| DE | 199 19 682 A1 | 11/2000 |
| DE | 102 16 184 A1 | 2/2003 |
| DE | 103 24 958 A1 | 12/2004 |
| DE | 103 33 603 A1 | 2/2005 |
| DE | 103 60 666 A1 | 7/2005 |
| WO | WO 2007/036386 A1 | 4/2007 |
| WO | WO 2008064700 A1 * | 6/2008 |

OTHER PUBLICATIONS

German Search Report dated Jan. 21, 2008 with English translation (nine (9) pages).

* cited by examiner

US 7,974,763 B2

PROCESS AND ONBOARD POWER SUPPLY OF A MOTOR VEHICLE WITH AN ANTICIPATING TEMPORARY TORQUE DERIVATION OF THE INTERNAL-COMBUSTION ENGINE

CROSS-REFERENCE TO RELATED APPLICATIONS

This application is a continuation of PCT International Application No. PCT/EP2008/006681, filed Aug. 14, 2008, which claims priority under 35 U.S.C. §119 from German Patent Application No. DE 10 2007 040 905.4, filed Aug. 30, 2007, the entire disclosures of which are herein expressly incorporated by reference.

BACKGROUND AND SUMMARY OF THE INVENTION

The invention relates to a method for reducing the energy consumption of a motor vehicle having at least one electric onboard power supply to which at least one electric consuming device is connected.

The number of electric consuming devices in motor vehicles has increased considerably. In order to reduce the $CO_2$ discharge in the vehicle, hydraulically operating consuming devices are being replaced by electric consuming devices. Thus, for example, an electric steering system (EPS) may replace a hydraulic steering system of the motor vehicle. However, for short periods of time, such electric consuming devices may make high power demands on the onboard vehicle power supply. This also results in a high demand on the stability of the onboard power supply of the motor vehicle. A sufficiently high electric voltage or electric power has to be available, particularly in the case of high loads occurring for short periods of time.

It is an object of the invention to provide a method that permits the implementation of an efficient onboard power supply and, in addition, the reduction of the energy consumption of a motor vehicle.

According to an aspect of the invention, there is provided a method of operating the internal-combustion engine in a first operating condition with a first injection quantity and with a first ignition point in time. For example, the electric generator of the vehicle and the battery of the vehicle jointly supply the onboard power supply in order to supply the electric consuming devices with a sufficient electric voltage. In the first operating condition, the generator may be running to capacity.

In a second operating condition, the internal-combustion engine is operated by a second injection quantity which is higher than the first injection quantity and with a second ignition point in time. With respect to the capacity of the internal-combustion engine, the second ignition point in time is less favorable in comparison to the first ignition point in time in the case of the second injection quantity. The second injection quantity, which is higher in comparison to the first injection quantity, increases the capacity of the internal-combustion engine per se and makes it possible for the internal-combustion engine to supply a torque that is higher per se to the electric generator of the motor vehicle. In a manner surprising to the driver, the rotational speed of the internal-combustion engine will increase without any countermeasure, so that the driver would have the impression that there is a defect. In order to compensate this torque increase, according to exemplary embodiments of the invention, the ignition point in time is adjusted from the first ignition point in time to the second ignition point in time in the second operating condition, whereby the capacity of the internal-combustion engine or its torque may be essentially reduced to the extent to which its torque has been increased by the increase of the injection quantity. The result of the second operating condition is a torque derivation of the internal-combustion engine, and the rotational speed of the engine remains largely constant during the transition from the first operating condition into the second operating condition.

In a third operating condition, the internal-combustion engine is operated with the second injection quantity and largely the first ignition point in time, so that the capacity or torque of the internal-combustion engine will be higher in the third operating condition in comparison to the second operating condition.

A driving situation detection device provided in the vehicle will detect a substantially imminent special driving situation on the basis of the driver's previous behavior when steering the vehicle or of the previous action of the vehicle beforehand and initiate that the internal-combustion engine changes from the first operating condition into the second operating condition. With the recognition of a substantially imminent special driving situation, a torque derivation of the internal-combustion engine is therefore caused according to exemplary embodiments of the invention by an increase of the injection quantity, which has the purpose of stabilizing the onboard power supply voltage if the latter will be necessary in the near future.

In an exemplary embodiment of the invention, the electric consuming device is an electrically actuated steering system, a chassis control system, or a chassis supporting system of the motor vehicle, and the substantially imminent special driving situation is a parking and/or maneuvering operation. This is a driving situation in which a low electric voltage in the onboard power supply becomes noticeable to the driver in a particularly unpleasant manner.

In the case of related art onboard power supplies, a delay of the load upon the electric generator is initiated when an electric consuming device that exercises a fairly high load upon the onboard power supply is switched on, such as an electric steering system. The consuming device is first fed from the vehicle battery and subsequently increasingly by the generator. Typically, this operation—the so-called load response—will last several seconds. As a result of this delay, more extensive rotational speed fluctuations of the internal-combustion engine are avoided when consuming devices with a high current demand are switched on.

In an exemplary embodiment of the invention, a greater electric load upon the onboard power supply, particularly in the third operating condition of the internal-combustion engine, is transmitted to the electric generator of the vehicle largely without delay. Thus, particularly in the third operating condition, no so-called load response operation is carried out.

In an exemplary embodiment of the invention, when a special driving situation is detected, the driving situation detection device causes the internal-combustion engine to change from the second into the third operating condition. As a result of the torque derivation in the second operating condition, because of the adjustment of the ignition point in time that can be technically implemented very rapidly during the transition to the third operating condition, the torque derived from the internal-combustion engine can be made available within a very short time. The internal-combustion engine will not die and can supply the required torque to the electric generator. The electric generator can feed a higher electric power into the onboard power supply, and the electric voltage is stabilized or will not break down despite a suddenly occurring higher load in the onboard power supply. Alternatively, when a special driving situation is detected, the driving situation detection device may cause the internal-combustion engine to change directly from the first into the third operating condition, without first changing into the second operating condition.

In an exemplary embodiment of the invention, the driving situation detection device recognizes the occurrence of the special driving situation by the fact that the electric voltage of the onboard power supply is about to break down. A monitoring of the voltage and, as required, a torque-increasing adjustment of the advance angle can be technically implemented in a relatively simple and cost-effective manner.

In an exemplary embodiment of the invention, the driving situation detection device takes into account who the actual driver is, as well as how he has previously acted. In particular, the actual driver can be recognized by the vehicle key used by him. This increases the hit rate of the prediction that a parking and/or maneuvering operation is imminent. When the driving situation detection device recognizes, for example, that the concerned driver always exhibits a characteristic approach, this hit rate for detecting an imminent parking and/or maneuvering operation will be increased.

In an exemplary embodiment of the invention, the driving situation detection device detects whether the speed of the vehicle falls below a predetermined threshold value, whether the reverse gear is engaged, and whether the difference between the absolute value of the actual steering angle and the absolute value of the steering angle is greater at an earlier point in time than a predetermined threshold value. The internal-combustion engine may be changed from the first operating condition into the second operating condition, and it is assumed that a so-called "reverse-steering operation" has occurred which represents a first of three alternatives for initiating a parking and/or maneuvering operation.

In an exemplary embodiment of the invention, the driving situation detection device detects whether the speed of the vehicle falls below a predetermined threshold value, whether the speed of the vehicle falls below the threshold value for a predefined time period, and whether the difference between the absolute value of the actual steering angle and the absolute value of a predetermined steering angle threshold value is greater than a predetermined threshold value. The internal-combustion engine may be changed from the first operating condition into the second operating condition, and it is assumed that a so-called "turn-steering operation" has occurred which represents a second of three alternatives for initiating a parking and/or maneuvering operation.

In an exemplary embodiment of the invention, the driving situation detection device detects whether the reverse gear is engaged, whether the speed of the vehicle falls below a predetermined threshold value, whether the difference between the absolute value of the actual steering angle and the absolute value of the steering angle is greater at an earlier point in time than a predetermined threshold value, whether the speed of the vehicle falls below the predetermined threshold value for a predefined time period, and whether the steering angle is greater than a predetermined threshold value. The internal-combustion engine may be changed from the first operating condition into the second operating condition, and it is assumed that a so-called "stationary-steering operation" has occurred which represents the third of three alternatives for initiating a parking and/or maneuvering operation.

According to another aspect of the invention, there is provided an onboard power supply of a motor vehicle which has a program-controlled driving situation detection device that carries out a method described above. Furthermore, a program-controlled driving situation detection device is provided that implements the method described above or causes its implementation.

In the following, the method according to exemplary embodiments of the invention will be explained in detail by flow charts using the example of a parking and/or maneuvering operation. The same reference symbols illustrate identical or identically acting functions.

Other objects, advantages, and novel features of the present invention will become apparent from the following detailed description of one or more preferred embodiments when considered in conjunction with the accompanying drawings.

DETAILED DESCRIPTION OF THE DRAWINGS

According to an exemplary embodiment of the invention, the motor vehicle is equipped with an electric steering system, a chassis control system, and/or a chassis supporting system. For manually carrying out a parking maneuver or a parking or maneuvering operation, the electric steering system requires a sufficiently high electric voltage. When, for reasons of a $CO_2$ reduction during the operation of the motor vehicle, the parking maneuver is carried out while an onboard power supply voltage is reduced, the steering system will be sluggish. This is unpleasant for the driver, particularly in the case of a parking and/or maneuvering operation that is to be carried out rapidly. However, according to exemplary embodiments of the invention, the direct imminence of a parking maneuver can be detected very reliably; the electric onboard power supply voltage can then be increased shortly before the parking maneuver to shortly after the parking maneuver; and the electric onboard power supply voltage can then be lowered again for another $CO_2$ reduction.

Figure 1:
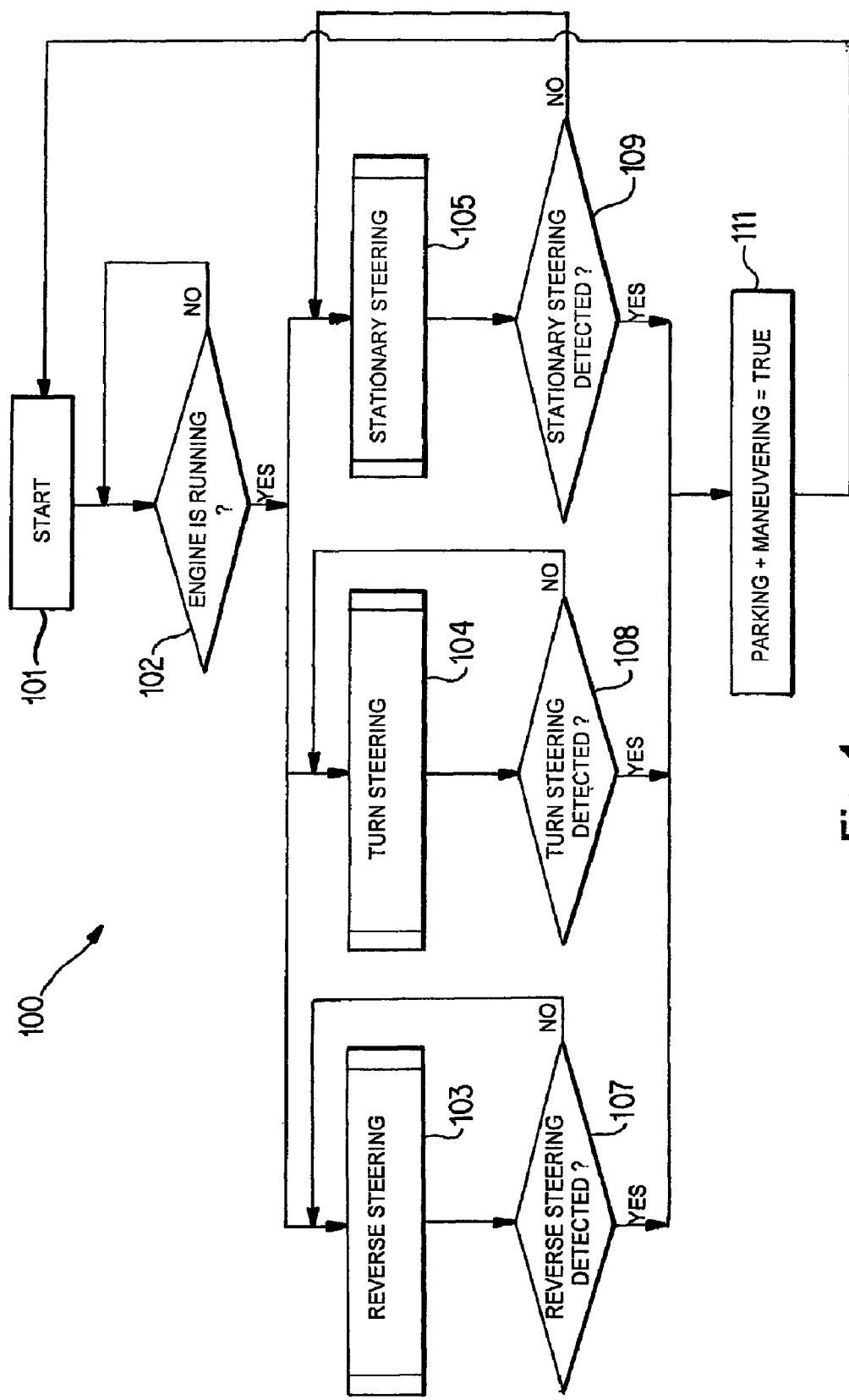
FIG. 1 illustrates a flow chart of a method according to exemplary embodiments of the invention with three mutually parallel running algorithms, each of which detects an imminent parking and/or maneuvering operation having a specific definition.

FIG. 1 illustrates a flow chart 100 of the method according to exemplary embodiments of the invention with three mutually parallel running algorithms 103, 104, and 105, each of which detects an imminent parking and/or maneuvering operation having a specific definition. The method 100 according to exemplary embodiments of the invention starts with Step 101. In Step 102, it is checked whether the vehicle engine is running. If the answer is "no", Step 102 will be carried out again. If the answer is "yes", the algorithm 103 "reverse steering" for detecting a reverse-steering operation, the algorithm 104 "turn steering" for detecting a turn-steering operation, and the algorithm 105 "stationary steering" for detecting a stationary-steering operation are each carried out parallel to one another.

If, within the scope of the reverse-steering algorithm 103, a reverse steering is detected in Step 107, the method according to an exemplary embodiment of the invention is based on an imminent or already occurring parking and/or maneuvering operation (Step 111 "parking & maneuvering=true"), and the supply voltage is temporarily raised to the second higher level for the duration of the parking and/or maneuvering operation. If, within the scope of the turn-steering algorithm 104, a turn steering is detected in Step 108, the method according to an exemplary embodiment of the invention is based on an imminent or already occurring parking and/or maneuvering operation (Step 111 "parking & maneuvering=true"), and the supply voltage is temporarily raised to the second higher level for the duration of the parking and/or maneuvering operation. If, within the scope of the stationary-steering algorithm 105, a stationary steering is detected in Step 109, the method according to an exemplary embodiment of the invention is based on an imminent or already occurring parking and/or maneuvering operation (Step 111 "parking & maneuvering=true"), and the supply voltage is temporarily raised to the second higher level for the duration of the parking and/or maneuvering operation.

Figure 2:
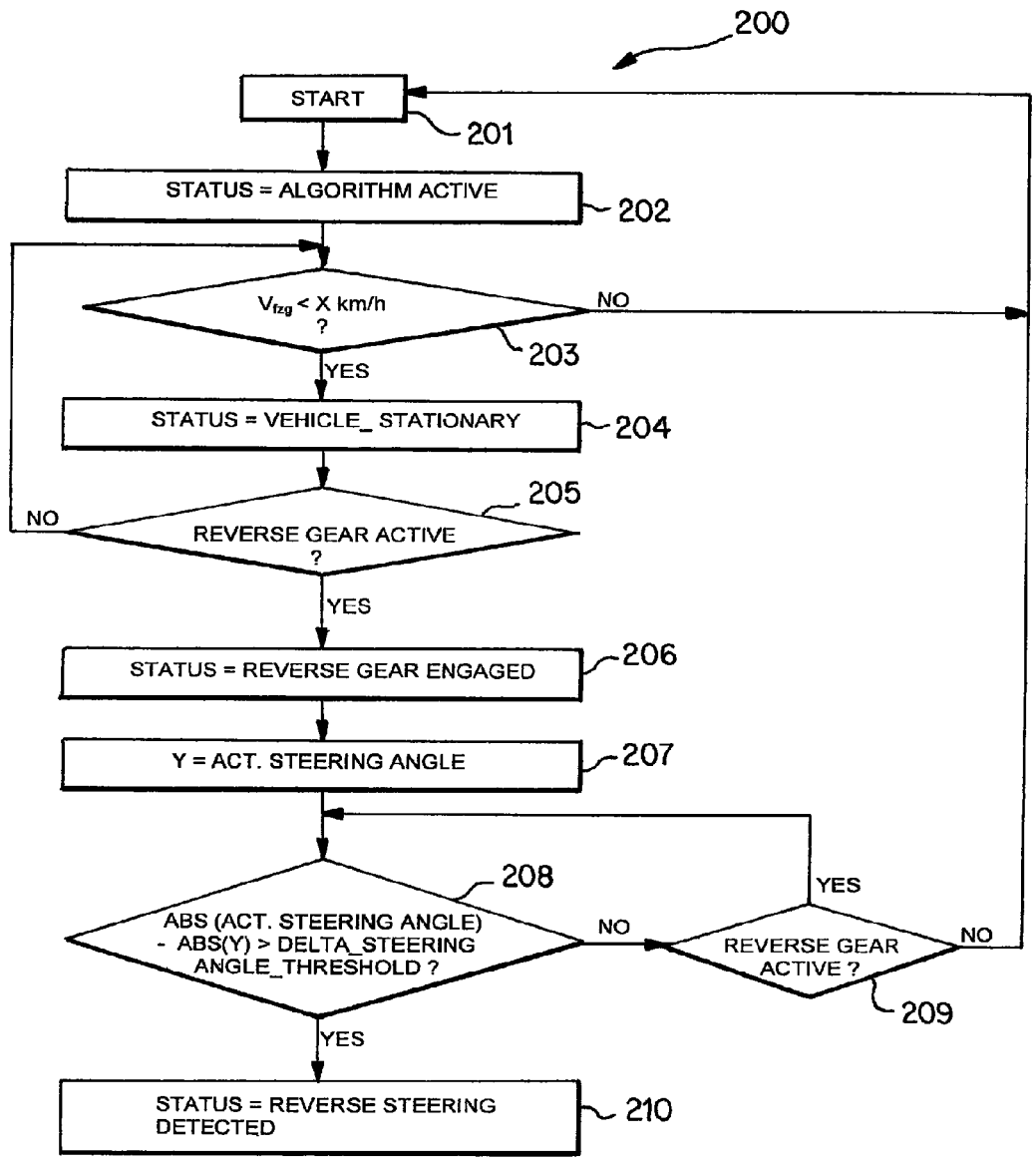
FIG. 2 illustrates the first of the three parallel running algorithms for detecting an imminent parking and/or maneuvering operation.

The flow chart 200 of FIG. 2 shows the details of the first algorithm 103 for the detection of a reverse-steering operation. After the start of the algorithm in Step 201, the algorithm 103 will be active (Step 202) for monitoring whether there is a reverse-steering operation. In Step 203, it is determined whether the vehicle speed $v_{fzg}$ is lower than a predetermined speed x km/h. If $v_{fzg}$ is greater than or equal to x km/h, the algorithm 103 will begin again at Step 201. If the vehicle speed $v_{fzg}$ is lower than the predetermined speed x km/h, this is considered to be Status 204; i.e., the vehicle is considered to be stationary. In Step 205, it will then be checked whether the reverse gear is active or whether it is engaged. If the reverse gear is active or engaged, this is considered to be Status 206; i.e. the reverse gear is considered to be engaged, and Step 207 will follow. In Step 207, the actual steering angle of the vehicle will be determined, and this steering angle will be assigned to variable y. In Step 208, it is checked whether the difference between the absolute value of a new actual steering angle and the absolute value of the previous actual steering angle y is greater than a predetermined steering angle threshold value; i.e. Abs (act. steering angle)–Abs(y)>delta_steering angle threshold. If so, this is recognized as reverse steering (Status 210). Otherwise, it will be checked again in Step 209 whether the reverse gear is active or engaged. If the reverse gear is active or engaged in Step 209, the checking will be repeated in Step 208. If the reverse gear is not active or engaged in Step 209, the algorithm will restart with Step 201. In other words, it is checked in Step 208 whether a clear steering motion is taking place. If a reverse steering is considered to be detected (Status 210), the internal-combustion engine of the motor vehicle is changed from the first operating condition into the second operating condition temporarily or for the duration of the parking and/or maneuvering operation.

Figure 3:
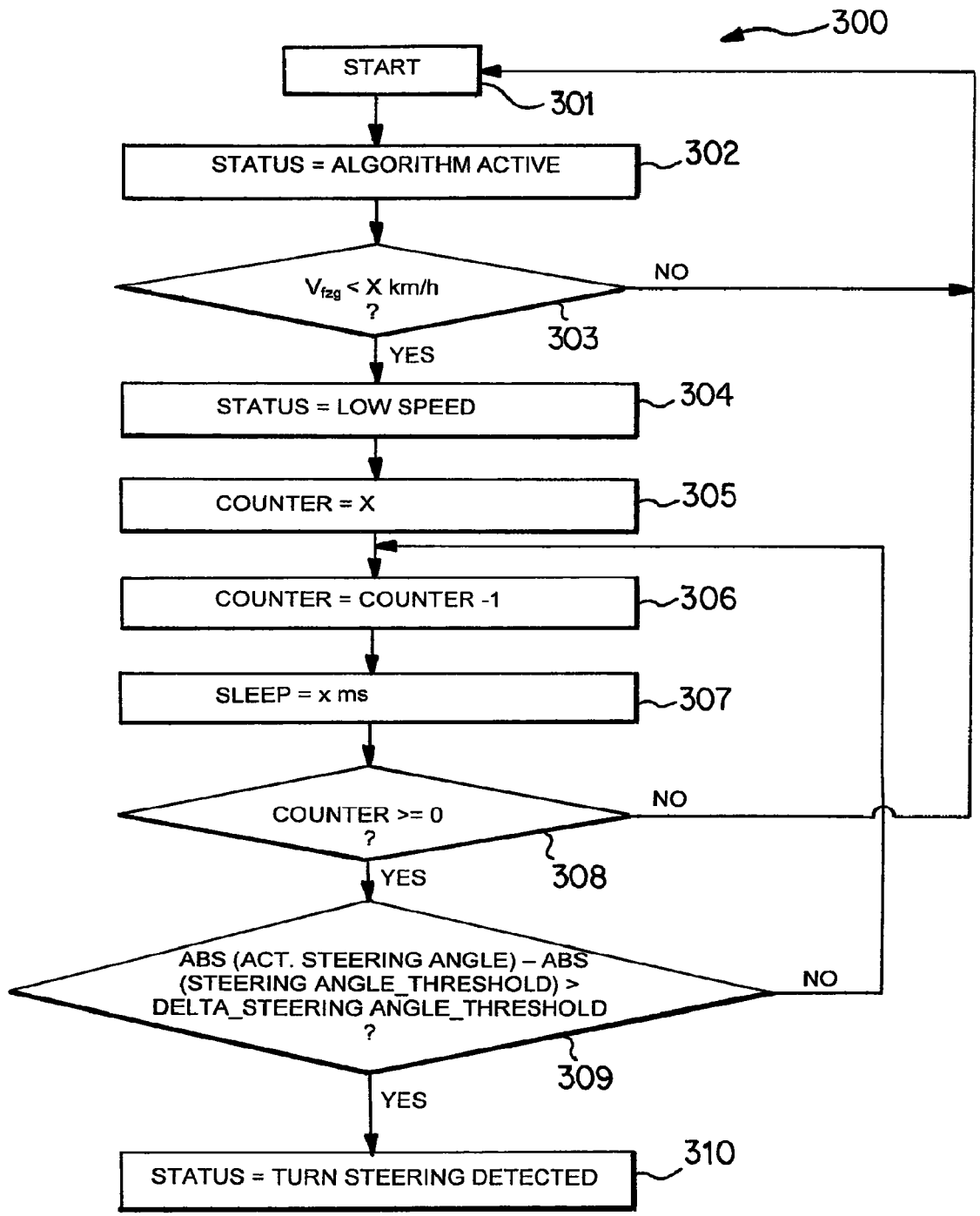
FIG. 3 illustrates the second of the three parallel running algorithms for detecting an imminent parking and/or maneuvering operation.

The flow chart of FIG. 3 illustrates the details of the second algorithm 104 for detecting a turn-steering operation. After the start of the algorithm in Step 301, the algorithm 104 is active for monitoring (Step 302) as to whether a turn-steering operation is present. In Step 303, it is checked whether the vehicle speed $v_{fzg}$ is lower than a predetermined speed x km/h. If $v_{fzg}$ is greater than or equal to x km/h, the algorithm 104 will begin again at Step 301. If the vehicle speed $v_{fzg}$ is lower than the predetermined speed x km/h, this is considered to be Status 304; i.e. the vehicle is considered to be a vehicle at low speed. In Step 305, a counter is set at a predetermined counter reading x. In Step 306, the counter reading is reduced by 1, and in Step 307, a predetermined pause of x ms (sleep=x ms) is inserted. After the predetermined pause, it is checked in Step 308 whether the counter reading is greater than or equal to zero. If the answer is "no", the algorithm 104 will begin again at Step 301. If the answer is "yes", it is checked in Step 309 whether the difference between the absolute value of the actual steering angle and the absolute value of a predetermined steering angle threshold value is greater than a predetermined difference steering angle threshold value; i.e. Abs (actual steering angle)–Abs (steering angle threshold value) >delta steering angle threshold value. If the answer is "no", Steps 306, 307 and 308 will be carried out again. If the answer is "yes", Status 310 is "turn steering detected", and the internal-combustion engine of the motor vehicle is changed from the first operating condition into the second operating condition temporarily or for the duration of the parking and/or maneuvering operation.

Figure 4:
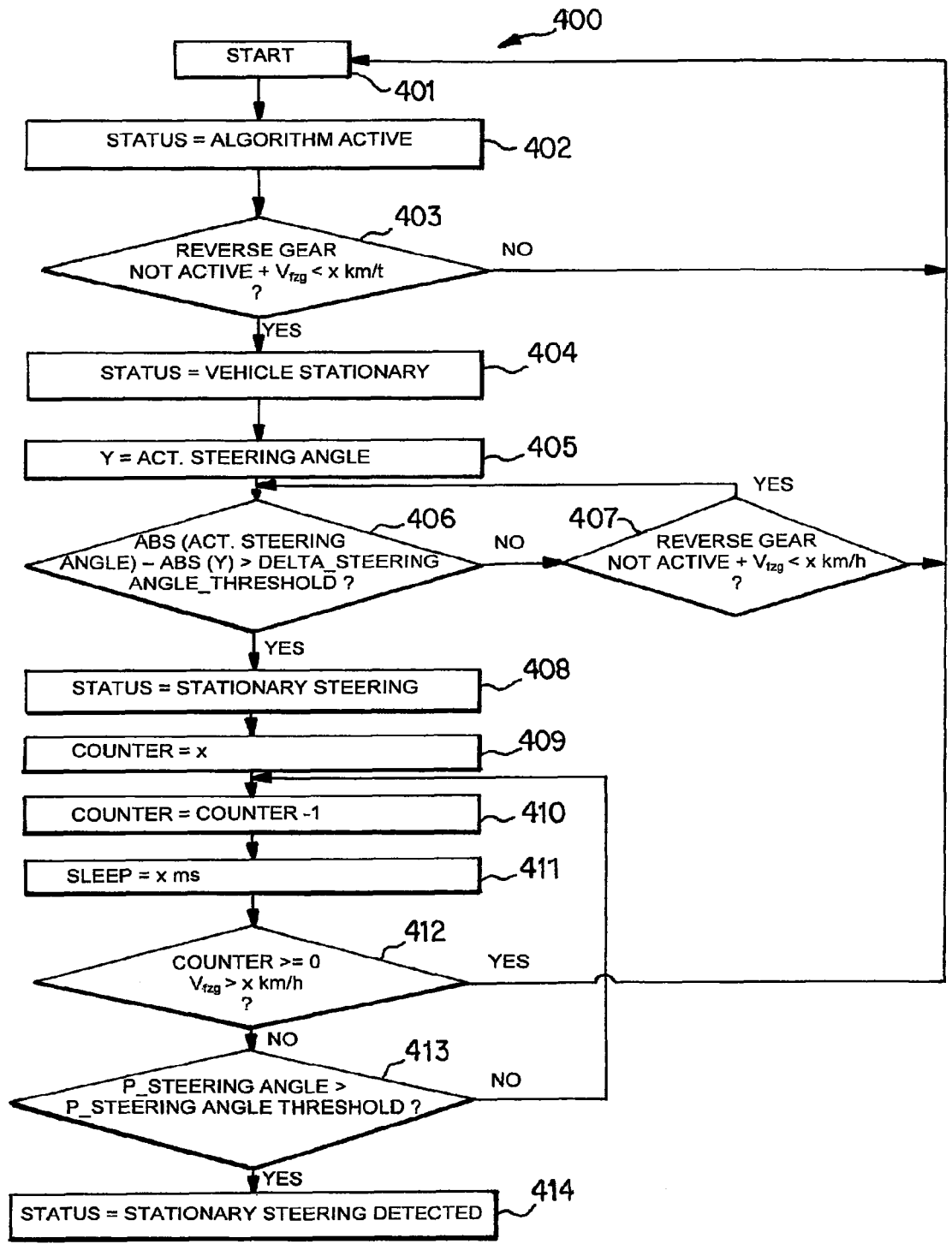
FIG. 4 illustrates the third of the three parallel running algorithms for detecting an imminent parking and/or maneuvering operation.

The flow chart 400 of FIG. 4 shows the details of the third algorithm 105 for detecting a stationary steering operation. After the start of the algorithm in Step 401, the algorithm 105 is active for monitoring (Step 402) as to whether a stationary steering operation is present. In Step 403, it is checked whether the revere gear is not active or engaged and whether the vehicle speed $v_{fzg}$ is lower than a predetermined speed x km/h. If at least one of the criteria has not been met, the algorithm 105 will begin again at Step 401. If both criteria of Step 403 have been met, Status 404 is considered to be "vehicle stationary". In Step 405, the value of a variable y is set to the actual value of the steering angle of the vehicle. In Step 406, it will be checked whether the difference between the absolute value of a new actual steering angle and the absolute value of the previous steering angle y is greater than a predetermined difference steering angle threshold value; i.e. Abs (actual steering angle)–Abs(y)>delta steering angle threshold value. If the answer is "no", it is checked in Step 407 whether the reverse gear is not active and whether the vehicle speed is lower than the predetermined speed x km/h. If at least one of the criteria has not been met, the algorithm 105 will start again with Step 401. If both criteria have been met, Step 406 will be carried out again. If the result of the comparison in Step 406 is "yes", the Status 408 is considered to be "stationary steering". In Step 409, a counter is set to a predetermined counter reading x. In Step 410, the counter is reduced by the value of "1". A predetermined pause of x ms is made in Step 411. After the end of pause "sleep=x ms", it is checked in Step 412 whether the counter reading is greater than or equal to zero and whether the vehicle speed is higher than a predefined speed. If the answer is "yes", the sequence will begin again with Step 401. If the answer is "no", it is checked in Step 413 whether the power actually supplied by the vehicle for supporting the steering (P_steering angle) is greater than a predefined steering power threshold value (P_steering angle_threshold). The threshold value may be in a range which is above the typical power for steering movements in the first operating condition and below the maximal power for steering movements in the first operating condition. If the answer is "no", the sequence is continued with Step 410. If the answer is "yes", the Status 414 is considered to be "stationary steering detected", and the internal-combustion engine of the motor vehicle is changed from the first operating condition into the second operating condition temporarily or for the duration of the parking and/or maneuvering operation.

The shifting back into the first operating condition takes place when the engine is running, and may take place after a predetermined time period, such as approximately 3 minutes, after the shifting-over into the third operating condition.

If the engine of the vehicle is switched off before the expiration of the predetermined time period, the shifting back into the first operating condition may take place immediately thereafter. After a subsequent start of the engine, the shifting-over into the third operating condition may take place immediately. The shifting back into the first operating condition may then not take place as late as after the expiration of the predetermined time period but after the expiration of the time period that had not yet elapsed when the engine was switched off.

In addition, the shifting back into the first operating condition may take place when the distance covered by the vehicle since the shifting over into the third operating condition is greater than a predetermined distance, such as approximately 50 m, or when the speed of the vehicle exceeds a predetermined speed, such as approximately 30 km/h.

A corresponding sequential control (not shown) automatically causes the described operations of back-shifting, etc.

It is understood that the invention can also be implemented in an embodiment in which only some of the algorithms 103, 104 and 105 are carried out.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reducing energy consumption of a motor vehicle having an internal-combustion engine and at least one electric onboard power supply to which at least a first electric consuming device is connected, the method comprising the acts of:
   detecting, by a driving situation detection device provided in the vehicle, a substantially imminent special driving situation based on at least one of a driver's previous behavior when steering the vehicle and a previous action of the vehicle, and
   upon detecting the substantially imminent special driving situation, causing the internal-combustion engine to change from a first operating condition into a second operating condition, wherein:
   in the first operating condition, the internal-combustion engine is operated with a first injection quantity and a first ignition point,
   in the second operating condition, the internal-combustion engine is operated with a second injection quantity higher than the first injection quantity and with a second ignition point, and
   the second ignition point is less favorable than the first ignition point with respect to a capacity of the internal-combustion engine in the case of the second injection quantity.

2. The method according to claim 1, wherein:
   the electric consuming device is an electrically actuated steering system, a chassis control system, or a chassis supporting system of the motor vehicle, and
   the special driving situation is at least one of a parking operation and a maneuvering operation.

3. The method according to claim 2, wherein the driving situation detection device detects the occurrence of the special driving situation if an electric voltage of the onboard power supply is about to break down.

4. The method according to claim 1, further comprising the act of:
   upon detecting the special driving situation, causing the internal-combustion engine to change from the second operating condition into a third operating condition, wherein in the third operating condition, the internal-combustion engine is operated with the second injection quantity and substantially the first ignition point, such that the capacity of the internal-combustion engine is higher in the third operating condition than the second operating condition.

5. The method according to claim 4, wherein a greater electric loading of the onboard power supply is transmitted without any substantial delay to an electric generator of the vehicle in the third operating condition of the internal-combustion engine.

6. A method for reducing energy consumption of a motor vehicle having an internal-combustion engine and at least one electric onboard power supply to which at least a first electric consuming device is connected, the method comprising the acts of:
   detecting, by a driving situation detection device provided in the vehicle, a substantially imminent special driving situation based on at least one of a driver's previous behavior when steering the vehicle and a previous action of the vehicle, and
   upon detecting the substantially imminent special driving situation, causing the internal-combustion engine to change from a first operating condition into a third operating condition, wherein:
   in the first operating condition, the internal-combustion engine is operated with a first injection quantity and a first ignition point,
   in a second operating condition, the internal-combustion engine is operated with a second injection quantity higher than the first injection quantity and with a second ignition point, and the second ignition point is less favorable than the first ignition point with respect to a capacity of the internal-combustion engine in the case of the second injection quantity, and
   in a third operating condition, the internal-combustion engine is operated with the second injection quantity and substantially the first ignition point, such that the capacity of the internal-combustion engine is higher in the third operating condition than the second operating condition.

7. The method according to claim 1, wherein the driving situation detection device accounts for an identity of the driver and how the driver has behaved in the past.

8. The method according to claim 7, wherein the identity of the driver is detected by a vehicle key used by the driver.

9. The method according to claim 1, wherein the driving situation detection device detects whether a speed of the vehicle falls below a predetermined threshold value, whether a reverse gear is engaged, and whether a difference between an absolute value of a current steering angle and an absolute value of a previous steering angle is greater than a predetermined threshold value.

10. The method according to claim 1, wherein the driving situation detection device detects whether a speed of the vehicle falls below a predetermined threshold value, whether the speed of the vehicle falls below the threshold value for a predefined time period, and whether a difference between an absolute value of a current steering angle and an absolute value of a previous steering angle is greater than a predetermined threshold value.

11. The method according to claim 1, wherein the driving situation detection device detects whether a reverse gear is engaged and a speed of the vehicle falls below a predetermined threshold value, whether a difference between an absolute value of a current steering angle and an absolute value of a previous steering angle is greater than a predetermined threshold value, whether the speed of the vehicle falls below the predetermined threshold value for a predefined time period, and whether the current steering angle is greater than a predetermined threshold value.

12. An onboard power supply of a motor vehicle, wherein the onboard power supply comprises a program-controlled driving situation detection device which carries out the method according to claim 1.

13. A program-controlled driving situation detection device, wherein the driving situation detection device carries out the method according to claim 1.

14. A method for reducing energy consumption of a motor vehicle having an internal-combustion engine, the method comprising the acts of:
   detecting a substantially imminent special driving situation, and
   upon detecting the substantially imminent special driving situation, causing the internal-combustion engine to change from a first operating condition into a second operating condition, wherein:
   in the first operating condition, the internal-combustion engine is operated with a first injection quantity and a first ignition point,
   in the second operating condition, the internal-combustion engine is operated with a second injection quantity higher than the first injection quantity and with a second ignition point, and
   the second ignition point is less favorable than the first ignition point with respect to a capacity of the internal-combustion engine in the case of the second injection quantity.

15. The method according to claim 14, wherein the special driving situation is at least one of a parking operation and a maneuvering operation.

16. The method according to claim 14, further comprising the act of:
   upon detecting the special driving situation, causing the internal-combustion engine to change from the second operating condition into a third operating condition,
   wherein in the third operating condition, the internal-combustion engine is operated with the second injection quantity and substantially the first ignition point, such that the capacity of the internal-combustion engine is higher in the third operating condition than the second operating condition.

17. The method according to claim 14, wherein the detecting of the substantially imminent driving situation comprises the act of detecting whether a speed of the vehicle falls below a predetermined threshold value, whether a reverse gear is engaged, and whether a difference between an absolute value of a current steering angle and an absolute value of a previous steering angle is greater than a predetermined threshold value.

18. The method according to claim 14, wherein the detecting of the substantially imminent driving situation comprises the act of detecting whether a speed of the vehicle falls below a predetermined threshold value, whether the speed of the vehicle falls below the threshold value for a predefined time period, and whether a difference between an absolute value of a current steering angle and an absolute value of a previous steering angle is greater than a predetermined threshold value.

19. The method according to claim 14, wherein the detecting of the substantially imminent driving situation comprises the act of detecting whether a reverse gear is engaged and a speed of the vehicle falls below a predetermined threshold value, whether a difference between an absolute value of a current steering angle and an absolute value of a previous steering angle is greater than a predetermined threshold value, whether the speed of the vehicle falls below the predetermined threshold value for a predefined time period, and whether the current steering angle is greater than a predetermined threshold value.

* * * * *